US012568257B2

(12) United States Patent
Gallusser

(10) Patent No.: US 12,568,257 B2
(45) Date of Patent: Mar. 3, 2026

(54) CONTENT INSERTION USING QUALITY SCORES FOR VIDEO

(71) Applicant: Disney Enterprises, Inc., Burbank, CA (US)

(72) Inventor: Fabian Gallusser, Palo Alto, CA (US)

(73) Assignee: Disney Enterprises, Inc., Burbank, CA (US)

( * ) Notice: Subject to any disclaimer, the term of this patent is extended or adjusted under 35 U.S.C. 154(b) by 191 days.

(21) Appl. No.: 18/457,287

(22) Filed: Aug. 28, 2023

(65) Prior Publication Data

US 2025/0080778 A1 Mar. 6, 2025

(51) Int. Cl.
*H04N 21/234* (2011.01)
*H04N 21/84* (2011.01)

(52) U.S. Cl.
CPC ....... *H04N 21/23424* (2013.01); *H04N 21/84* (2013.01)

(58) Field of Classification Search
CPC .......................... H04N 21/23424; H04N 21/84
See application file for complete search history.

(56) References Cited

U.S. PATENT DOCUMENTS

| | | | |
|---|---|---|---|
| 9,460,451 B2 | 10/2016 | Ruiz et al. | |
| 9,473,828 B2 | 10/2016 | Wang et al. | |
| 10,459,970 B2 | 10/2019 | Zhu et al. | |
| 10,841,666 B1 * | 11/2020 | Effinger ........... | H04N 21/23418 |
| 11,223,864 B1 | 1/2022 | Malik et al. | |
| 2012/0242900 A1 * | 9/2012 | Huang ................. | G11B 27/031 |
| | | | 348/563 |
| 2013/0159092 A1 | 6/2013 | Lahaie et al. | |
| 2016/0062995 A1 * | 3/2016 | Ng ........................ | G06F 16/435 |
| | | | 707/723 |
| 2018/0160196 A1 * | 6/2018 | Wahl .................. | H04N 21/2668 |
| 2020/0204838 A1 | 6/2020 | Badawiyeh et al. | |
| 2020/0213644 A1 | 7/2020 | Gupta et al. | |

(Continued)

OTHER PUBLICATIONS

"Contextual Ad Breaks for Better Ad Placement," https://www.vionlabs.com/contextual-ad-breaks, 7 pages, printed on May 11, 2023.

(Continued)

*Primary Examiner* — Randy A Flynn
(74) *Attorney, Agent, or Firm* — Kwan & Olynick LLP

(57) ABSTRACT

In some embodiments, a method determines a break in a delivery of an instance of catalog content and determines instances of supplemental content. A plurality of transition scores is generated for a plurality of combinations of one or more instances of supplemental content and the instance of catalog content based on a comparison of first metadata for the one or more instances of supplemental content to second metadata for the instance of catalog content. The first metadata is based on an analysis of content characteristics of the instance of supplemental content and the second metadata is based on an analysis of content characteristics of the instance of catalog content. The method uses the transition scores to select a combination of one or more instances of supplemental content. A transition score rates a transition between the instance of catalog content and the combination of one or more instances of supplemental content.

20 Claims, 11 Drawing Sheets

100—

(56) References Cited

U.S. PATENT DOCUMENTS

2022/0058215 A1      2/2022  Johnson et al.

OTHER PUBLICATIONS

"Inserting ad breaks into video content using Amazon Rekognition, AWS Elemental MediaConvert and AWS Elemental MediaTailor," https://aws.amazon.com/blogs/media/inserting-ad-breaks-into-video-content-using-amazon-rekognition-aws-elemental-mediaconvert-and-aws-elemenet, printed from website on May 11, 2023, 14 pages.

* cited by examiner

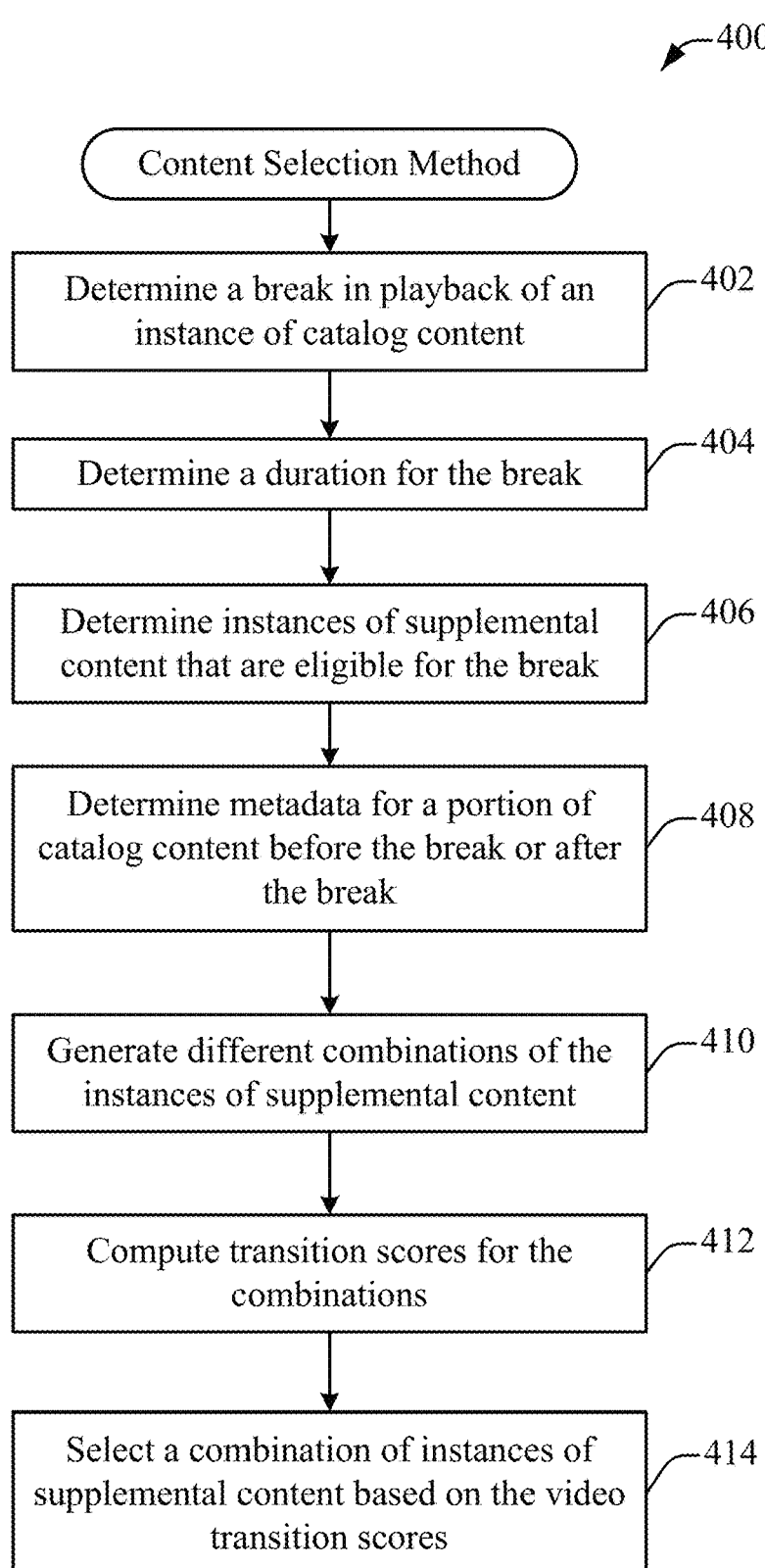

—400

Content Selection Method

Determine a break in playback of an instance of catalog content —402

Determine a duration for the break —404

Determine instances of supplemental content that are eligible for the break —406

Determine metadata for a portion of catalog content before the break or after the break —408

Generate different combinations of the instances of supplemental content —410

Compute transition scores for the combinations —412

Select a combination of instances of supplemental content based on the video transition scores —414

FIG. 4

| Dimension | First instance of content | Second instance of content | Dimension Score |
|---|---|---|---|
| Presence of car | Yes | Yes | 1 |
| Pace (Low/Med/High) | Low | Med | 0.5 |
| Brand | Phone Co. #1 | Car. Co. #1 | 0 |
| % of dialogue | 25% | 45% | 0.8 |

VTSF(Conten1,Content2)=0.575

| Dimension | Cat. content | SC #1 | SC #2 | SC #3 | SC #4 | Cat. content |
|---|---|---|---|---|---|---|
| Duration | / | 1 min | 30 secs | 30 secs | 30 secs | / |
| Presence of car | No | Yes | Yes | No | No | No |
| Pace (L/M/H) | Low | Med | Low | Med | High | High |
| Brand | Brand #1 | Brand #2 | Brand #3 | Brand #1 | Brand #4 | Brand #5 |
| % of dialogue | 25% | 45% | 70% | 0% | 20% | 80% |

Content (before break) — 702

1 min break — 704

Content (after break) — 706

Selection?

| Combination | 1st Transition Score | 2nd Transition Score | 3rd Transition Score | Final Score |
|---|---|---|---|---|
| Pause → SC #1 → Resume | 0.3250 | 0.2875 | / | 0.3063 |
| Pause → SC #2 → SC #3 → Resume | 0.3875 | 0.2000 | 0.4250 | 0.3375 |
| Pause → SC #3 → SC #2 → Resume | 0.8125 | 0.2000 | 0.2250 | 0.4125 |
| Pause → SC #2 → SC #4 → Resume | 0.3875 | 0.1250 | 0.6000 | 0.3708 |
| Pause → SC #4 → SC #2 → Resume | 0.4875 | 0.1250 | 0.2250 | 0.2792 |
| Pause → SC #3 → SC #4 → Resume | 0.8125 | 0.5750 | 0.6000 | 0.6625 |
| Pause → SC #4 → SC #3 → Resume | 0.4875 | 0.5750 | 0.4250 | 0.4958 |

FIG. 8

CONTENT INSERTION USING QUALITY SCORES FOR VIDEO

BACKGROUND

A content delivery system may deliver instances of catalog content, which may be movies, shows, etc. The delivery of catalog content may have supplemental content inserted during breaks of the delivery of catalog content. The supplemental content may be inserted using different criteria. For example, manual selections of metadata, such as keywords that describe the content, demographics for the content, etc., may be used to select instances of supplemental content. Also, a system may be used in which values that are received from supplemental content owners are used to select instances of supplemental content. These two systems may not always select an optimal instance of supplemental content to insert into the instance of catalog content.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

FIG. 4 depicts a simplified flowchart for selecting combinations of instances of supplemental content according to some embodiments.

FIG. 7 depicts an example of a selection of instances of supplemental content for a break according to some embodiments.

FIG. 8 depicts a table that summarizes the transition scores for different combinations according to some embodiments.

DETAILED DESCRIPTION

Figure 1:
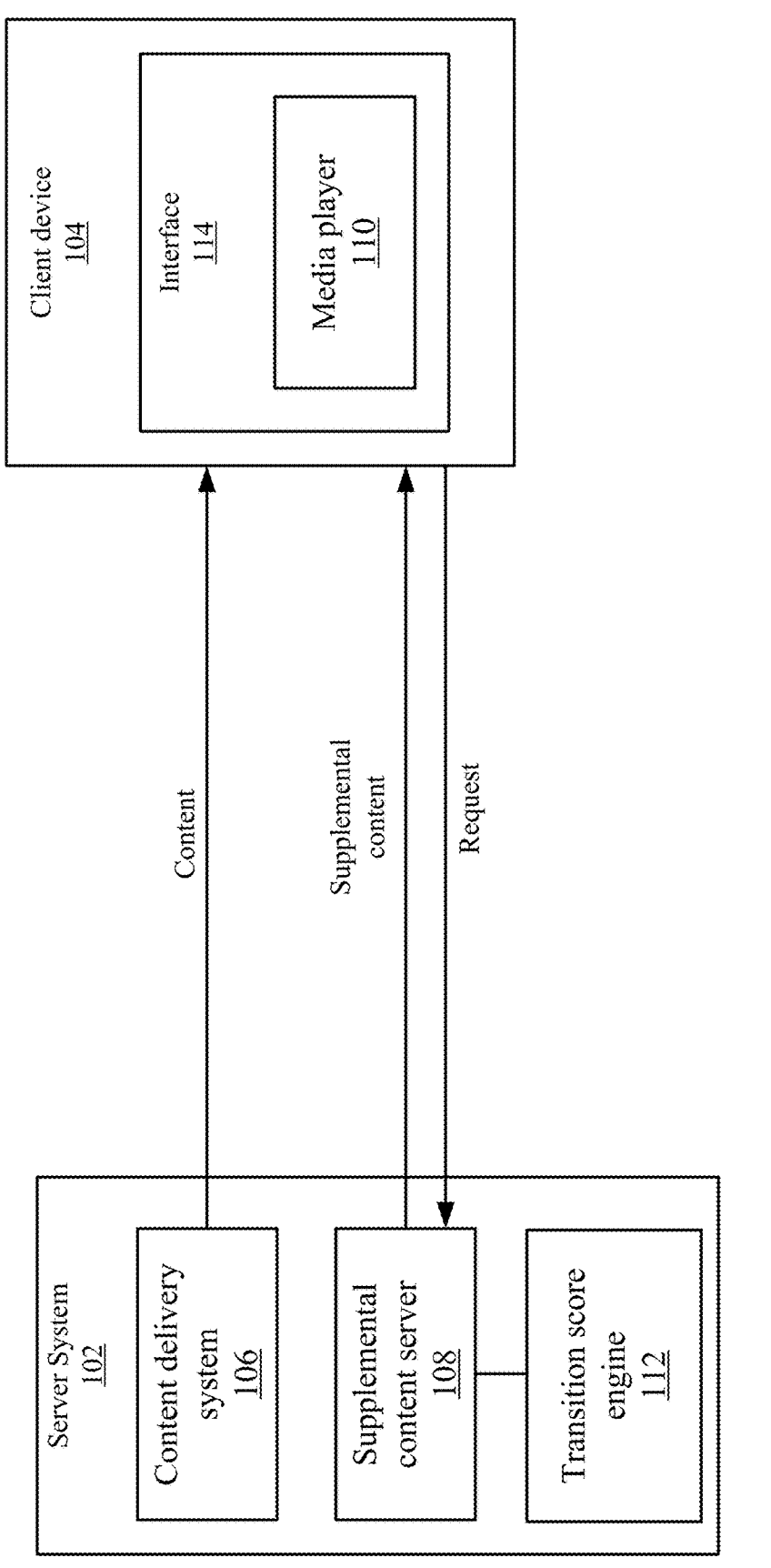
FIG. 1 depicts a simplified system for generating transition scores according to some embodiments.

Described herein are techniques for a content delivery system. In the following description, for purposes of explanation, numerous examples and specific details are set forth to provide a thorough understanding of some embodiments. Some embodiments as defined by the claims may include some or all the features in these examples alone or in combination with other features described below, and may further include modifications and equivalents of the features and concepts described herein.

System Overview

A system generates a video quality transition score (e.g., transition score) between at least two instances of content, such as an instance of catalog content and one or more instances of supplemental content, two or more instances of supplemental content, etc. In some embodiments, instances of catalog content may be offered for delivery to clients, such as based on request from user accounts. The instances of supplemental content may be inserted during the playback of the instances of catalog content. The instances of supplemental content and the instances of catalog content may be used in other ways, such as being displayed on a webpage together, in first party recommendations, adding informational details, etc. Although catalog content and supplemental content are described, other types of content may be used. Generally, two instances of content may be compared using processes described herein. When the term "content" is used, the term may refer to supplemental content or catalog content. Also, an instance of catalog content or supplemental content may refer to a specific file of content, such as a movie, show, episode, advertisement, etc. When "supplemental content" or "catalog content" is used, this may refer to one or more instances of supplemental content or one or more instances of catalog content, respectively.

The transition score may rate the transition from the first instance of content to the second instance of content. For example, when a break occurs during the delivery of an instance of catalog content, one or more instances of supplemental content may be inserted in the break. There may be multiple transitions due to the break. For example, a first transition may be from the content before the break in the instance of catalog content to the content for an instance of supplemental content that is inserted into a first slot of the break. If there is only one slot in the break, then a second transition from the instance of supplemental content to the content after the break in the instance of catalog content may be analyzed. Additional transitions may occur if multiple slots for multiple instances of supplemental content exist in the break. Here, transitions between instances of supplemental content may be analyzed. Although the discussion may discuss transition scores using catalog content and supplemental content, the transition score may be used between any two instances of content. Transition scores may not be computed for some transitions, such as for the transition from an instance of supplemental content to the portion of catalog content after the break.

The system may generate transition scores for possible combinations of instances of supplemental content that could be inserted into the break. The combinations may include one or more instances of supplemental content. Then, based on the transition scores, the system may select one of the combinations based on a ranking associated with the transition scores. For example, the combination that offers the highest ranked transition score may be selected. The highest ranked transition score may indicate that this combination provides the optimal transition between the instance of catalog content and the combination of instances of supplemental content. Also, when a system in which values are associated with the combinations, such as bid values that may be received if the instances of supplemental content are delivered, the transition scores may be used to alter the values. For example, the values for each respective combination may be weighted by the respective transition score for a combination. This may alter the values to generate weighted values. Then, the highest ranked weighted value may be selected. The transition scores and the weighted values may improve the selection of instances of supplemental content because the transition of content is analyzed. This may improve the viewer experience as the optimal transition between content is considered along with the value associated with the combination of instances of supplemental content.

The system may calculate the transition score using robust metadata about the instances of catalog content and the instances of supplemental content. For example, metadata dimensions and associated labels may offer granular descriptions of characteristics of the respective instances of catalog content or supplemental content. Some examples of metadata dimensions include genre, objects, context/mood, pace, music type and volume, brand, etc. Each dimension may have associated labels that can be assigned to instances of supplemental content or catalog content. The dimensions and labels may be determined based on an analysis of content characteristics and will be described in more detail below. In some embodiments, the system may extract the metadata based on content in portions of an instance of catalog content, such as before and after a break, or other portions may be used. Also, the system may extract the metadata based on the content of instances of supplemental content. The use of robust metadata that is based on the content characteristics may improve the transition score. Using the metadata means that the transition score is based on more than manual selections. Also, the transition score may be automatically generated using the analysis of content characteristics. The robust metadata may also provide more information about the content, which provides a more accurate transition score.

A transition score engine may receive two instances of content, such as an instance of catalog content and an instance of supplemental content or two instances of supplemental content, and generate a transition score based on a comparison of respective metadata for the two instances of content. In some embodiments, a score between zero and one is used, where a lower score indicates a lower rated match and a higher score indicates a higher rated match. In some embodiments, the metadata is separated into multiple dimensions and the transition score engine may generate dimension scores for each of the dimensions, such as based on a distance between the associated labels in each dimension. Then, the transition score engine may generate the transition score based on the dimension scores for the respective dimensions. A higher score may indicate a higher quality of the transition between the two instances of content. The comparison of metadata may generate transition scores faster. For example, the system may analyze metadata faster than comparing the content of two instances of content. The speed of generating transition scores may be important when the decision of which instances of supplemental content need to be inserted is determined during the delivery of an instance of supplemental content.

The use of the transition score may improve the selection of instances of supplemental content. For example, the selection may be automated. The manual selection of information about the instances of supplemental content may not be needed because the analysis to generate metadata about the instances of supplemental content and the instances of catalog content may be automated. This improves the selection of instances of supplemental content because the metadata may not be subjective and inputted manually. Also, the selection may be more optimal in that a higher ranked transition can be automatically selected. Previously, the manual selections may not have provided the optimal transition between instances of content.

System

FIG. 1 depicts a simplified system 100 for generating transition scores according to some embodiments. System 100 includes a server system 102 and a client device 104. Although a single instances of server system 102 and client device 104 are shown, multiples instances will be appreciated. For instance, server system 102 may include multiple servers or other computing devices to provide the functionality described herein. Also, system 100 may include multiple client devices 104 that interact with server system 102.

Server system 102 may include a content delivery system 106 that delivers content (e.g., videos, audio, etc.) to client devices 104. In some embodiments, content delivery system 106 may use a content delivery network (CDN) (not shown) to deliver the content. The content may be associated with catalog content, which may be content that is requested by a user account associated with client device 104. For example, a user account may request a movie, an episode of a show, etc. Although videos are described herein, it will be understood that other content may also be delivered, such as a website, page of content, audio content (e.g., audio books, podcasts, radio, etc.), etc.

Client device 104 may be a computing device, such as a smartphone, living room device, personal computer, tablet, television, set-top box, etc. Client device 104 may include an interface 114 that may display the catalog content, such as videos. For example, a media player 110 may playback a video that is requested from content delivery system 106. A user account may use client device 104 and may be associated with a service (e.g., the user account signs up for the service). Also, the service may store characteristics for the user account, such as an age of a user, watch history, etc.

In some embodiments, catalog content may be a library of content that is offered by the service that uses content delivery system 106. Client devices 104 may request playback of an instance of catalog content. Supplemental content may be different from the catalog content, such as the supplemental content may not have been originally requested by client device 104 as compared to the request for the catalog content. An example of an instance of supplemental content may be an advertisement that is displayed during a break in the instances of catalog content. Supplemental content server 108 may detect when supplemental content should be displayed. For example, during the delivery of an instance of catalog content, a break may occur in which one or more instances of supplemental content should be consumed (e.g., displayed, played, etc.). In other embodiments, an instance of supplemental content may be displayed on a site, such as a web page, simultaneously with the instance of catalog content that client device 104 is displaying. Also, the instance of supplemental content may be displayed as recommendations. It will be understood that supplemental content may be displayed in different scenarios.

In some embodiments, supplemental content server 108 may communicate with other devices or modules to determine the instance of supplemental content to display. For example, supplemental content server 108 may receive a list of instances of supplemental content that are eligible to be displayed during a break. The list may be based on different factors, such as targeting rules that match the characteristics of the user account, or may be a full list of any instances of supplemental content that are available for that break. The targeting rules may be based on targeting characteristics, such as age, gender, location, device type, etc. When the instance of supplemental content is selected, server system 102 sends an instance of supplemental content to client device 104. Client device 104 may then display the instance of supplemental content. The display of the instance of supplemental content may form an impression, which is when an instance of supplemental content is displayed to the user account.

A transition score engine 112 may generate transition scores between a first instance of content and a second instance of content. The two instances of content, when discussed, may include different combinations of instances of catalog content and instances of supplemental content, such as an instance of catalog content and an instance of supplemental content, or an instance of supplemental content and an instance of supplemental content. The transition score may be based on different dimensions of metadata for the associated instances of content.

Examples of metadata that can be extracted include the dimensions of genre, objects, context/mood, pace, music type and volume, brand, etc. Other dimensions may also be appreciated. Within each dimension, different labels may be used. For example, the genre dimension may include the labels of horror, action-adventure, musical, comedy, animals and nature, etc. The labels for the genre dimension are based on a detected genre in the content. For example, transition score engine 112 may analyze characters or settings to determine the genre.

The context/mood dimension may include labels such as sad, wild, dramatic, wondrous, romantic, etc. The context/mood dimension may detect a mood of the content that is analyzed based on dialog, facial recognition, etc.

The objects dimension may include the labels of cars, phones, tires, etc. The labels in the objects dimension may describe an object that is detected during the content that is analyzed.

The pace dimension may include labels based on the measurement of the motion of the content in the portion of content. Labels may include a low, a medium, and a high pace.

The brand dimension may include labels based on a brand (e.g., logo, company name, etc.) detected in the content. A brand is name, term design, symbol or feature that distinguishes one seller's good or service from other sellers. The labels for the brand may include names of a company, a slogan, a symbol, etc.

The music type and volume may include labels based on the audio detected in the portion of content. Some labels include genre, tempo, dynamics, and overall loudness, etc.

The following will now describe the insertion of instances of supplemental content into an instance of catalog content, and then the generation of transition scores.

Insertion of Supplemental Content

Figure 2:
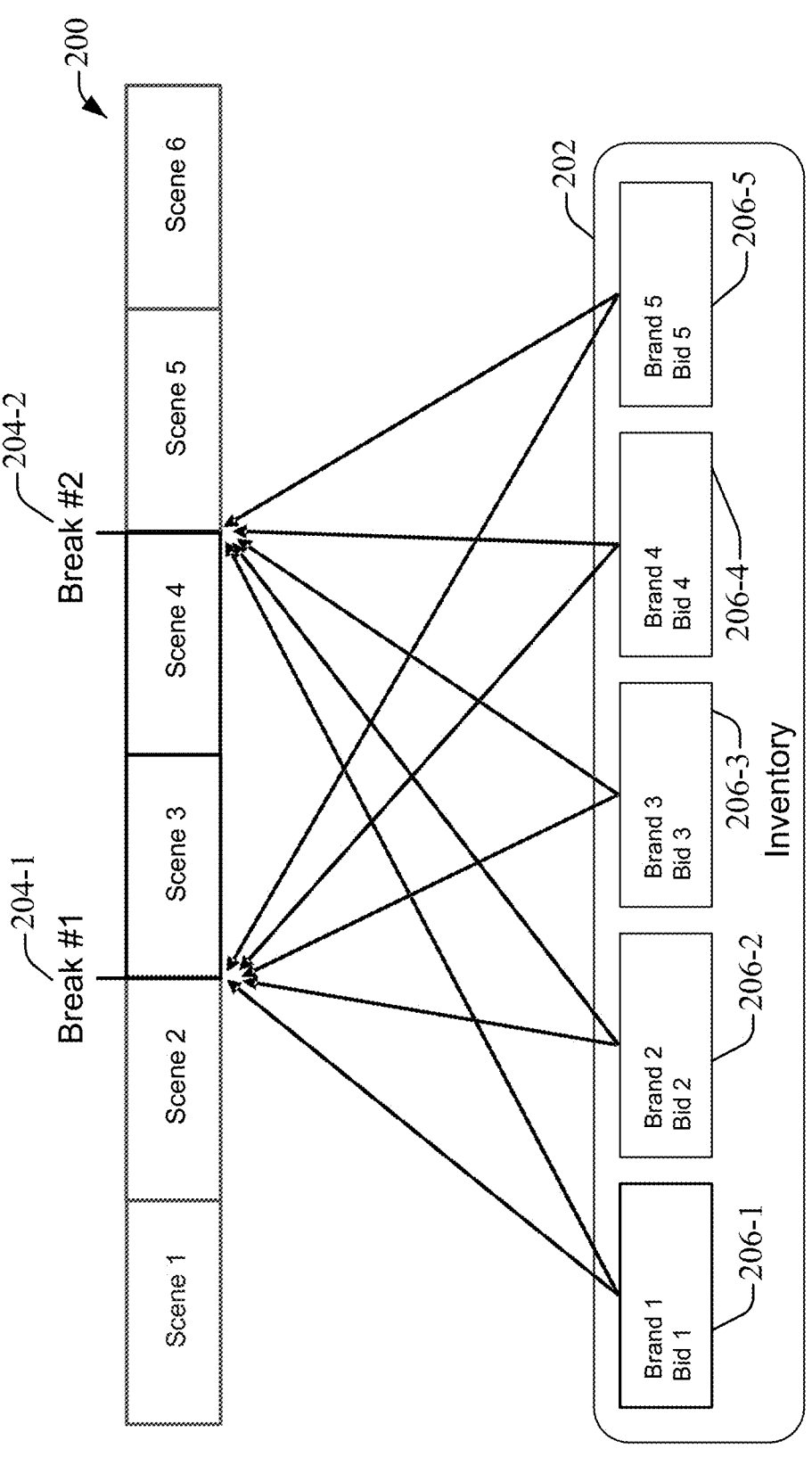
FIG. 2 depicts catalog content and supplemental content according to some embodiments.

FIG. 2 depicts catalog content and supplemental content according to some embodiments. A portion of an instance of supplemental content is shown at 200, which includes six scenes of scene 1 to scene 6. The instance of catalog content may have more content that is not shown. Although a scene is described, other portions may be appreciated, such as shots, a fixed time, a number of segments, etc. A shot may be a continuous capture of content from one camera angle. A scene may be based on an analysis of content where a singular theme includes a sequence of related shots that may take place in a similar space and time. The fixed time may be 6 seconds, or other times, and the number of segments may be 100 segments, or other numbers of segments.

Breaks may be inserted into the instance of catalog content, such as in between scenes, but other areas may be insertion points for breaks. In this example, a first break #1 at 204-1 is in between scene 2 and scene 3, and a second break #2 at 204-2 is in between scene 4 and scene 5. For a break, the playback of the instance of catalog content may be paused, and one or more instances of supplemental content may be inserted and delivered to client device 104 during the break. After the break, the instance of catalog content may resume delivery to client device 104 for playback.

An inventory 202 includes instances of supplemental content that can be inserted during the breaks at 204-1 and at 204-2. As shown at 206-1 to 206-5, five instances of supplemental content are eligible to be inserted into break #1 at 204-1 and break #2 at 204-2, but there may be other numbers of instances of supplemental content. It is noted that different instances of supplemental content may be eligible to be inserted into different breaks, such as instances of supplemental content 206-1 and 206-2 for break #1 and instances of supplemental content 206-3, 206-4, and 206-5 for break #2. The instances of supplemental content may include different values that value the instance of supplemental content. In some embodiments, the values are represented as bids. A bid may be a value that may be received if the instance of supplemental content is inserted in a break. Other values may be appreciated, such as the value may be a long term estimate of value for retaining a user account. In this example, at 206-1, the first instance of supplemental content may include brand 1 and bid 1. Brand 1 may be a name of the brand associated with the instance of supplemental content and bid 1 may be the value of the bid, such as X dollars. Other instances of supplemental content may have other characteristics, such as at 206-2, the second instance of supplemental content is associated with brand 2 and bid 2. Although brands and bids are discussed, the instances of supplemental content may be associated with other metadata as will be described below.

Figure 3:
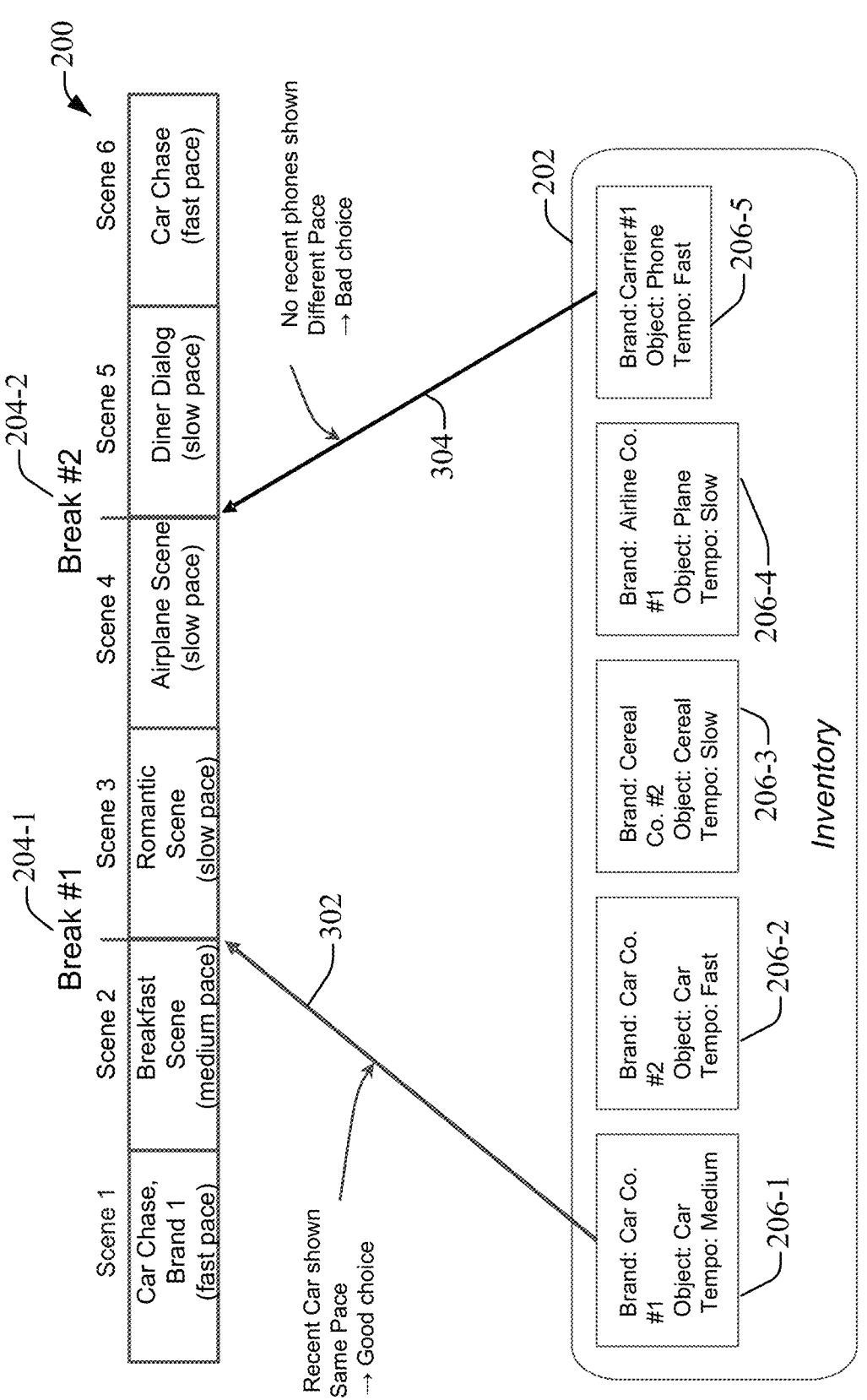
FIG. 3 shows an example of selecting instances of supplemental content to insert in breaks according to some embodiments.

Depending on the analysis, different instances of supplemental content may be selected to be inserted into break #1 at 204-1 and break #2 at 204-2. FIG. 3 shows an example of selecting instances of supplemental content to insert in breaks according to some embodiments. The scenes in the instance of catalog content have metadata associated with each respective scene. For example, scene 1 may be a car chase with a brand 1 car and a fast pace. Other scenes may have different other characteristics, such as scene 2 is a breakfast scene at a medium pace, scene 3 is a romantic scene at a slow pace, scene 4 is an airplane scene at a slow pace, scene 5 is a diner dialog at a slow pace, and scene 6 is a car chase at a fast pace.

In inventory 202, instances of supplemental content 206-1 to 206-5 also include respective metadata. For example, at 206-1, the first instance of supplemental content includes a brand of car company (co.) #1, an object of car, and tempo of a medium pace. At 206-2, the second instance of supplemental content includes a brand of car company #2, an object of car, and a tempo of fast. At 206-3, the third instance of supplemental content includes a brand of cereal company #2, an object of cereal, and a tempo of slow. At 206-4, a fourth instance of supplemental content includes the brand of airline company (co.) #1, an object of plane, and a tempo of slow. Finally, at 206-5, the fifth instance of supplemental content includes a brand of carrier #1, an object of phone, and a tempo of fast.

Supplemental content server 108 may determine which instance of supplemental content to insert in break #1 at 204-1 and break #2 at 204-2. This is a simple example, and multiple instances of supplemental content may be inserted in a respective break, which will be described in more detail below. At 302, supplemental content server 108 selects the first instance of supplemental content at 206-1 as a good choice. Some reasons for selecting the first instance of supplemental content is that a rental car is shown is a same object as the car in scene #1. Also, the pace is the same as the median pace found in scene #2. Also, at 304, an example of a bad choice is shown where the instance of supplemental content may not be selected. The fifth instance of supplemental content is at a different pace compared to the scenes before break #2 at 204-2, where the scenes before have a slow pace and the instance of supplemental content has a fast pace. Also, the object in the instance of supplemental content is a phone, and no phones are shown in the scenes before break #2 at 204-2. Accordingly, supplemental content server 108 may consider this instance of supplemental content a bad choice and may not select this instance of supplemental content for insertion. In contrast, the fourth instance of supplemental content, which shows an airline company #1 as the brand and an object of a plane, may be a better choice because the fourth scene shows an airplane scene that includes airplanes and also has the same pace.

The above described one example of content selection and the following will now describe the content selection in more detail.

Content Selection

FIG. 4 depicts a simplified flowchart 400 for selecting combinations of instances of supplemental content according to some embodiments. At 402, transition score engine 112 determines a break in playback of an instance of catalog content. Transition score engine 112 may receive a notification from supplemental content server 108 when a break is upcoming. The breaks may be predetermined. Also, the breaks may be optimally determined using transition scores, which will be described in more detail below in FIG. 10. Transition score engine 112 may receive a notification of a break from supplemental content server 108 when a break is upcoming. Also, transition score engine 112 may automatically determine when a break is upcoming, such as when breaks are on a predetermined schedule.

At 404, transition score engine 112 determines a duration for the break. The duration may be a total time in which the break lasts, such as 1 minute, 3 minutes, etc. Any number of instances of supplemental content may be inserted in the time period, such as one instance of supplemental content that is one minute long, two instances of supplemental content that are both 30 seconds long, two instances of supplemental content that are each 15 seconds long and on instance of supplemental content that is 30 seconds, etc. Also, a number of slots may be used to indicate a number of instances of supplemental content that may be inserted into the break. For example, four slots indicate four instances of supplemental content should be inserted in the break. Each slot may be associated with a time period or each slot may correspond to an instance of supplemental content of variable time.

At 406, transition score engine 112 determines instances of supplemental content that are eligible for the break. In some embodiments, the instances of supplemental content may be eligible for placement in the break based on characteristics, such as targeting characteristics. Other characteristics may be used also, such as the type or genre of the instance of catalog content, the time of the day, etc.

At 408, transition score engine 112 determines metadata for a portion of catalog content before the break or a portion of catalog content after the break. In one implementation, if the catalog content before the break and the catalog content after the break are being used, engine 112 may determine both portions. In another implementation, if one of the portions is not being used, such as the catalog content after the break may not be used, only one of the portions of catalog content before the break is used.

At 410, transition score engine 112 generates different combinations of the instances of supplemental content that are eligible for the break. The combinations may include one instance of supplemental content, two or more instances of supplemental content, etc. Also, the combinations may include the same instances of supplemental content, but in a different orders.

At 412, transition score engine 112 computes transition scores for the combinations. The computation of the transition scores will be described in more detail below with respect to FIG. 5.

At 414, transition score engine 112 selects a combination of instances of supplemental content based on the transition scores. In some embodiments, a combination with the highest ranked transition score may be selected. In some implementations, the highest ranked transition score may indicate the analysis predicted a combination of transitions, such as the transition between the portion of content before the break and an instance of supplemental content, the transitions between the instances of supplemental content in the combination, and the transition between the instance of supplemental content before the break and the portion of catalog content after the break were ranked the highest. The selection of the combination of instances may then be delivered to supplemental content server 108, which causes the delivery of the instances of supplemental content to client device 104. The selection of the highest ranked transition score may improve the delivery. For example, the transition between the portion of content before the break and an instance of supplemental content, the transitions between the instances of supplemental content in the combination, and the transition between the instance of supplemental content before the break and the portion of catalog content after the break improves the output of content at client device 104 as the transitions are selected to be optimal. In some embodiments, the higher ranked transitions may also offer more efficient delivery of content because compression efficiency may be achieved with transitions of similar content. That is, smoother transitions of more similar content may be more efficient compared to transitions that include content that is less similar. Also, the highest ranked transitions may efficiently use the duration of the break, such as higher ranked combinations may use an entire duration of the break.

Figure 5:
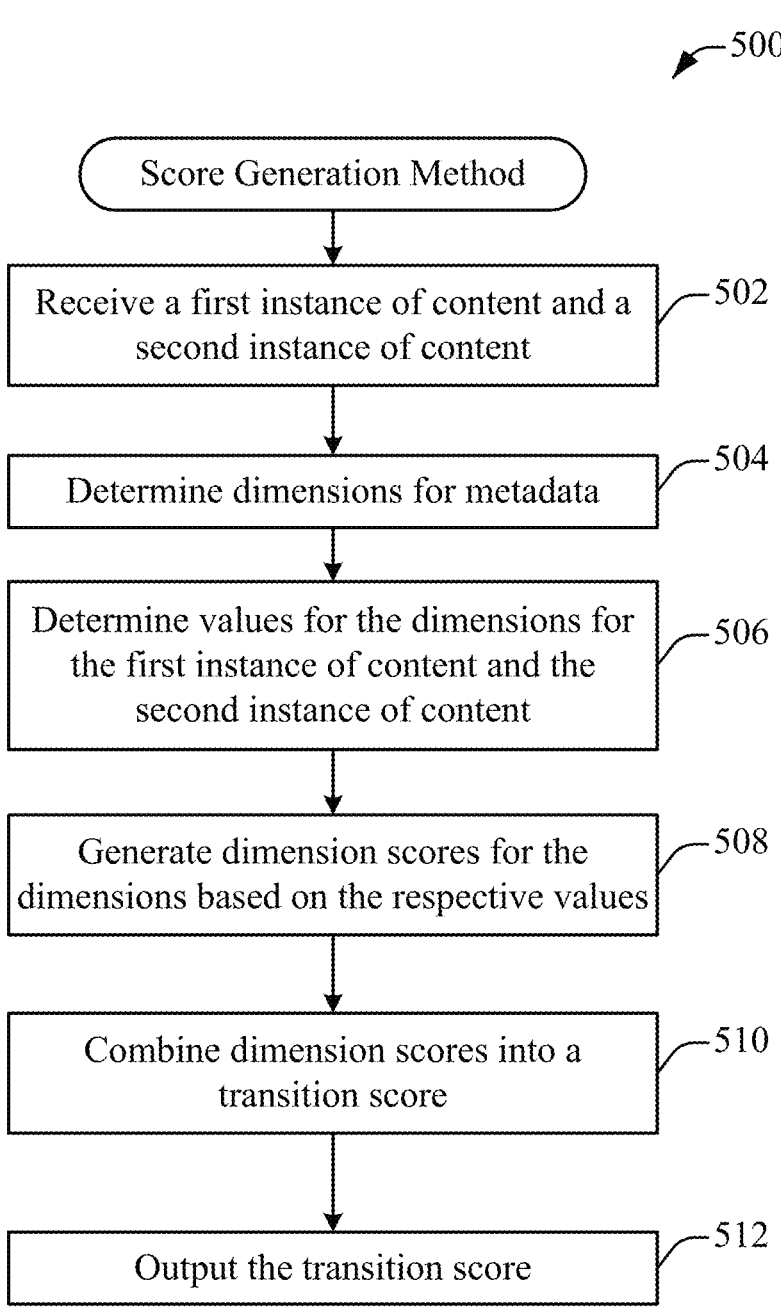
FIG. 5 depicts a simplified flowchart of a method for generating a transition score according to some embodiments.

FIG. 5 depicts a simplified flowchart 500 of a method for generating a transition score according to some embodiments. At 502, transition score engine 112 receives a first instance of content and a second instance of content. The first instance of content and the second instance of content may be different combinations of instances of catalog content and instances of supplemental content that will be compared. For example, if there are two instances of supplemental content, the first instance of content may be the portion of catalog content before the break and the second instance of content may be a first instance of supplemental content. Then, the first instance of content may be the first instance of supplemental content and the second instance of content may be a second instance of supplemental content. If there are no more instances of supplemental content, in the next comparison, the first instance of content may be the second instance of supplemental content and the second instance of content may be the portion of catalog content after the break.

At 504, transition score engine 112 determines different dimensions for the metadata. In some embodiments, the dimensions may be fixed for the analysis. In other embodiments, the dimensions that are determined may be based on analyzing the instances of content that are received. For example, for some instances of catalog content, different dimensions may be more important, and those dimensions are used. For example, tempo may be considered more important in audio content, but not brand; brand may be more important in video content, etc.

At 506, transition score engine 112 determines values for the dimensions for the first instance of content and the second instance of content. For example, the dimensions of genre, objects, context/mood, pace, music type and volume, brand, etc. may be used. In some embodiments, for a dimension of pace, the respective pace of the first instance of content and the respective pace for the second instance of content may be determined.

At 508, transition score engine 112 generates dimension scores for the dimensions based on the respective values. The dimension score may be computed in different ways. For example, the metadata for each dimension may be associated with a vector. For example, for the pace dimension, the slow, medium, and fast paces may be associated with vectors based on the associated labels. Transition score engine 112 may compute the distance between the two vectors. Then, the distance may be converted into the transition score, such as using transition score=1−distance, but other methods of generating the transition score may be appreciated. Although this method of computing the dimension score for dimensions is discussed, other comparisons of the values of dimensions may be used. For example, the nature of the dimension values may be used. A binary match may be used where a value of 1 is determined if the values match, and a value of 0 otherwise. For ordinal (naturally ordered) dimensions, 1—the difference in levels divided by the number of levels −1 may be used. For example, with five ordered levels, there is a 0.25 gap between consecutive levels. For categorical dimensions with no natural ordering, the binary mechanism may be used where value of 1 is determined if the values match, a value of 0 is determined otherwise. For continuous dimensions values, the dimension score may be the difference in values may be divided by the expected value range. The dimension score measures the quality of the transition between the first instance of content and the second instance of content. When a range of 0 to 1 is used, the value of 0 may indicate the worst ranked transition and the value of 1 may represent the highest ranked transition.

At 510, transition score engine 112 combines dimension scores into a transition score. The combination may be performed in different ways. In some embodiments, the average score of each respective dimension value for the dimensions may be used. Other combinations may be used, such as an aggregation of the dimension scores, a minimum of the dimension scores, a maximum of the dimension scores, a median of the dimension scores, etc.

At 512, transition score engine 112 outputs the transition score. The above process may be performed for each combination that is determined. This will result in respective transition scores for each combination. For example, the transition scores may be 0.75 for a first combination, 0.25 for a second combination, and 0.33 for a third combination.

Transition score engine 112 may select the first combination as the highest ranked in this case.

The following will now describe the generation of the transition scores in more detail.

Transition Score

Figure 6:
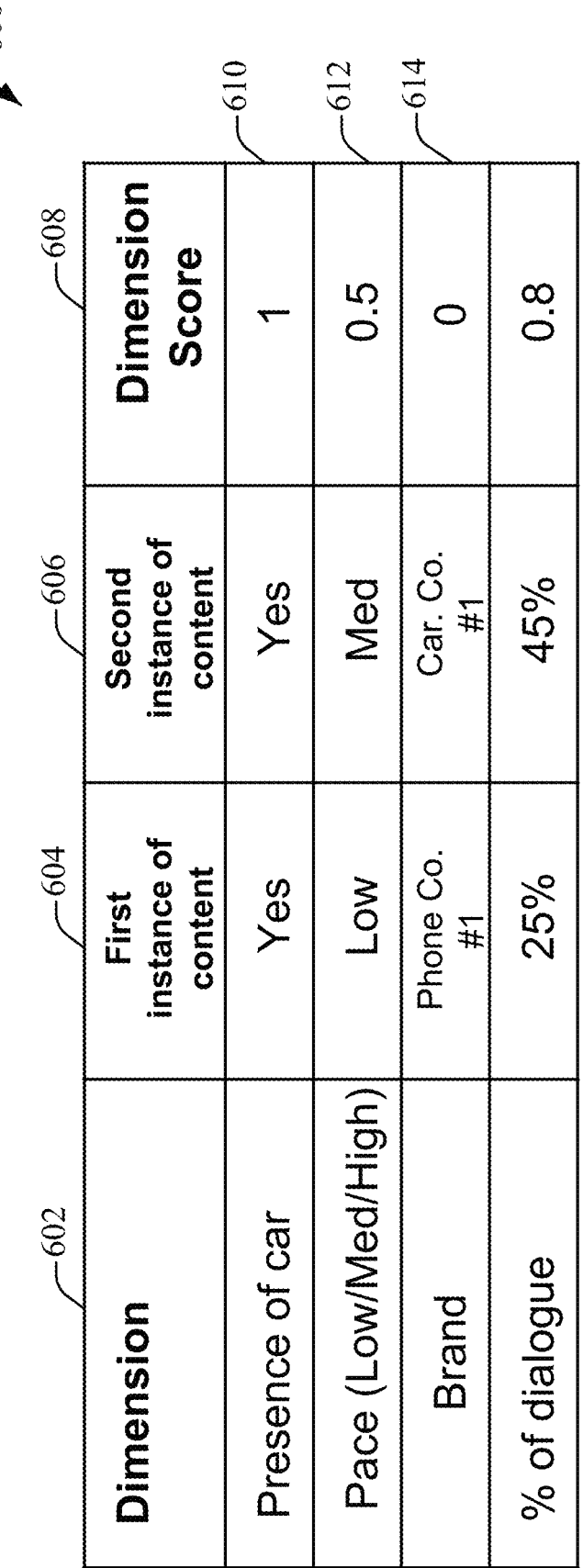
FIG. 6 depicts a table of dimensions and dimension scores according to some embodiments.

FIG. 6 depicts a table 600 of dimensions and dimension scores according to some embodiments. Table 600 includes columns 602 to 608 for a dimension, a first instance of content, a second instance of content, and a dimension score, respectively. The dimension may be the dimension of metadata. In this example, the dimensions are the presence of a car, the pace, the brand, and the percentage of dialogue. The percentage of dialogue may be what fraction of time there is dialogue over a period of time, such as there may be 50% of dialogue time in an instance of supplemental content. Columns 604 and 606 provide the values for the respective dimensions for the first instance of supplemental content and the second instance of supplemental content. For example, the first instance of content includes the values of "yes", "low", "phone company #1", and "25%" for the dimensions. The second instance of content includes the values of "yes", "med" (medium), "car company #1", and "45%" for the respective dimensions.

Transition score engine 112 may compare the dimension values to determine a dimension score for each dimension. The dimension scores are 1, 0.5, 0, and 0.8 for the dimensions, respectively. At 610, the dimension score of 1 may be generated because the values for the first instance of content and the second instance of the content are both "yes" for the presence of the car. A binary match may be used where there is a value of 1 when the values match and a value of 0 when the values do not match. The value of 1 indicates a highest possible match. At 612, the value of 0.5 may be generated based on an ordinal comparison where the pace includes three levels, and the difference between the low pace and the median pace yields a 0.5 score. At 614, the dimension score of 0 is generated based on a categorical comparison where phone company #1 does not match car company #0, and the value is zero. The percentage of dialogue may be for a continuous comparison where the difference in values are divided by an expected value range of 100 to yield 0.8.

Transition score engine 112 calculates the transition score using a function of video transition score function (VTSF) (content 1, content 2), which equals 0.575. The value of 0.575 may be the average of the dimension scores, but other functions may also be used.

As mentioned above, different combinations of supplemental content may be inserted into a break. FIG. 7 depicts an example of a selection of instances of supplemental content for a break according to some embodiments. The playback session includes a portion of catalog content at 702 before the break, a one-minute break at 704, and a portion of catalog content at 706 after the break.

A table 700 lists the values for the dimensions for eligible instances of supplemental content (SC) listed as SC #1, SC #2, SC #3, and SC #4. A column 708 lists the dimensions of duration, presence of car, pace, brand, and percentage of dialogue. Columns 710 to 720 list the values for the dimensions for the respective instances of content. For example, column 710 lists the dimension values for the portion of catalog content before the break, columns 712, 714, 716, and 718 lists the dimension values for the instances of supplemental content that are eligible for a selection, and column 720 lists the dimension values for the portion of catalog content after the break. The break is for one minute. Accordingly, different combinations of the instances of supplemental content may be used. For example, if supplemental content SC #1 is selected, its duration is one minute, and thus no other instance of supplemental content will fit in the break. However, different combinations of supplemental content, SC #2, SC #3, and SC #4 may be inserted in the one-minute break because the duration of these instances of supplemental content are 30 seconds.

FIG. 8 depicts a table 800 that summarizes the transition scores for different combinations according to some embodiments. A column 802 lists the different combinations that are possible. For example, the different combinations may include the portion of catalog content before the break and the portion of catalog content after the break as the first position and the last position in the combination. In between these portions, different combinations of supplemental content SC #1 to supplemental content SC #4 may be inserted. For example, a row 812 includes the instance of supplemental content SC #1. This is because the instance of supplemental content SC #1 is one minute, which is the duration of the break. The instances of supplemental content SC #2, SC #3, and SC #4 may be 30 seconds and thus these instances may be inserted in different combinations (e.g., combinations of two). These combinations are shown in the subsequent rows that are shown at 814. The possible combinations include different permutations of the instances, such as SC #2→SC #3, SC #3→SC #2, SC #2→SC #4, SC #4→SC #2, SC #3→SC #4, SC #4→SC #3.

Columns 804, 806, and 808 list a first transition score, a second transition score, and a third transition score (if needed), respectively. If other transition scores were possible, then additional columns may list the additional transition scores. Each transition score may be based on two instances of content that are in the sequential order of the combination. For example, for row 812, the first transition score is from the portion of catalog content before the break and the instance of supplemental content SC #1. Then, the second transition score is from the instance of supplemental content SC #1 to the portion of catalog content after the break. A third transition score is not generated because there are no more transitions. In row 816, three transition scores are determined. The first transition score is between the portion of catalog content before the break and the instance of supplemental content SC #2 for the first transition score. The second transition score is between the instance of supplemental content SC #2 and the instance of supplemental content SC #3. Then, the third transition score is between the instance of supplemental content #3 and the portion of catalog content after the break. The other transition scores are generated similarly.

After generating the transition scores, at 810, transition score engine 112 generates a final score based on the transition scores. Although an average score is described, other combinations of the transition scores may be used, such as an addition, a minimum, a maximum, a mean, a median, etc. In this example, the scores may be between the range 0 to 1, with a higher score being considered a better transition. Transition score engine 112 selects the highest ranked score at 818, which indicates this combination includes the highest ranked transition between the combinations. The combination in this case is the portion of catalog content before the break, the instance of supplemental content SC #3, the instance of supplemental content SC #4, and the portion of catalog content after the break.

Figure 9:
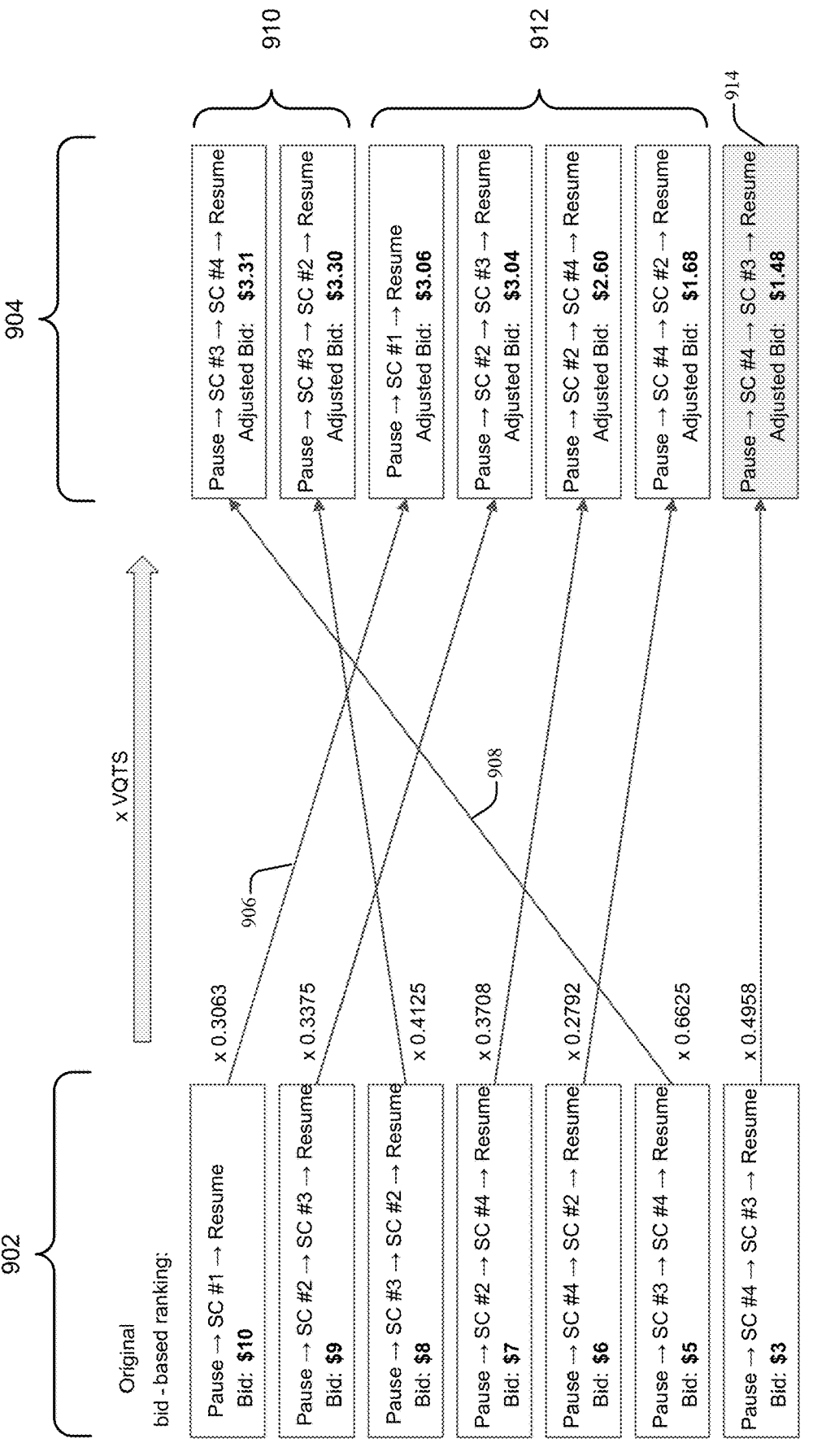
FIG. 9 depicts an example of using transition scores to alter values for combinations according to some embodiments.

In some embodiments, the combination with a highest ranked final score is selected for the break. In other embodiments, the transition scores may be used to select supplemental content for the break based on values associated with the combinations. FIG. 9 depicts an example of using transition scores to alter values for combinations according to some embodiments. The values may be associated with bid values. A bid value may be where supplemental content owners bid for placement of their instance of supplemental content in the break. At 902, an original bid-based ranking is shown. This ranking is based on the bid value of the combination of supplemental content. At 904, a ranking based on applying the final transition score to the bid value is shown.

The ranking at 902 lists the combinations with the highest bid first and the lowest bid last. For example, the highest bid is $10, and the lowest bid is $3. Then, the associated final transition score for the combination is used to alter the bid value. In some embodiments, the final transition score is multiplied by the bid value, but other adjustments may be used. Accordingly, given that the final transition score includes higher values for higher-ranked transitions and lower values for lower-ranked transitions, the bid value is adjusted based on the ranking of the transition in the combination. For example, at 906, the bid value for the combination of the portion of catalog content before the break, the instance of supplemental content SC #1, and the portion of catalog content after the break is $10*0.3063=$3.06. Also, at 908, the combination of the portion before the break, the instances of supplemental content SC #3 and SC #4, and the portion of catalog content after the break has its bid value altered by the transition score as $5*0.6625=$3.31. Accordingly, the combination at 908 is now ranked higher than the combination at 906 after applying the final transition scores. In this example, the new ranking ranks the combination that was altered at 908 first with a bid of $3.31. Also, the original top-ranked bid at 906 is now the third-ranked bid with a bid value of $3.06. The other bid values are also similarly altered. In summary, applying the final transition scores increased the ranking for the combinations at 910, decreased the ranking for the combinations at 912, and the ranking stayed the same at 914.

Transition score engine 112 may output the adjusted bids to supplemental content engine 108. Supplemental content engine 108 may then select the combination based on the adjusted bids. Supplemental content engine 108 may deliver the selection of the combination of instances to client device 104. For example, the delivery of the portion of catalog content before the break occurs. Then, supplemental content engine 108 delivers in the instances of supplemental content. Thereafter, the portion of catalog content after the break is delivered. As discussed, the transition between the instances is improved during the delivery.

Break Selection

Figure 10:
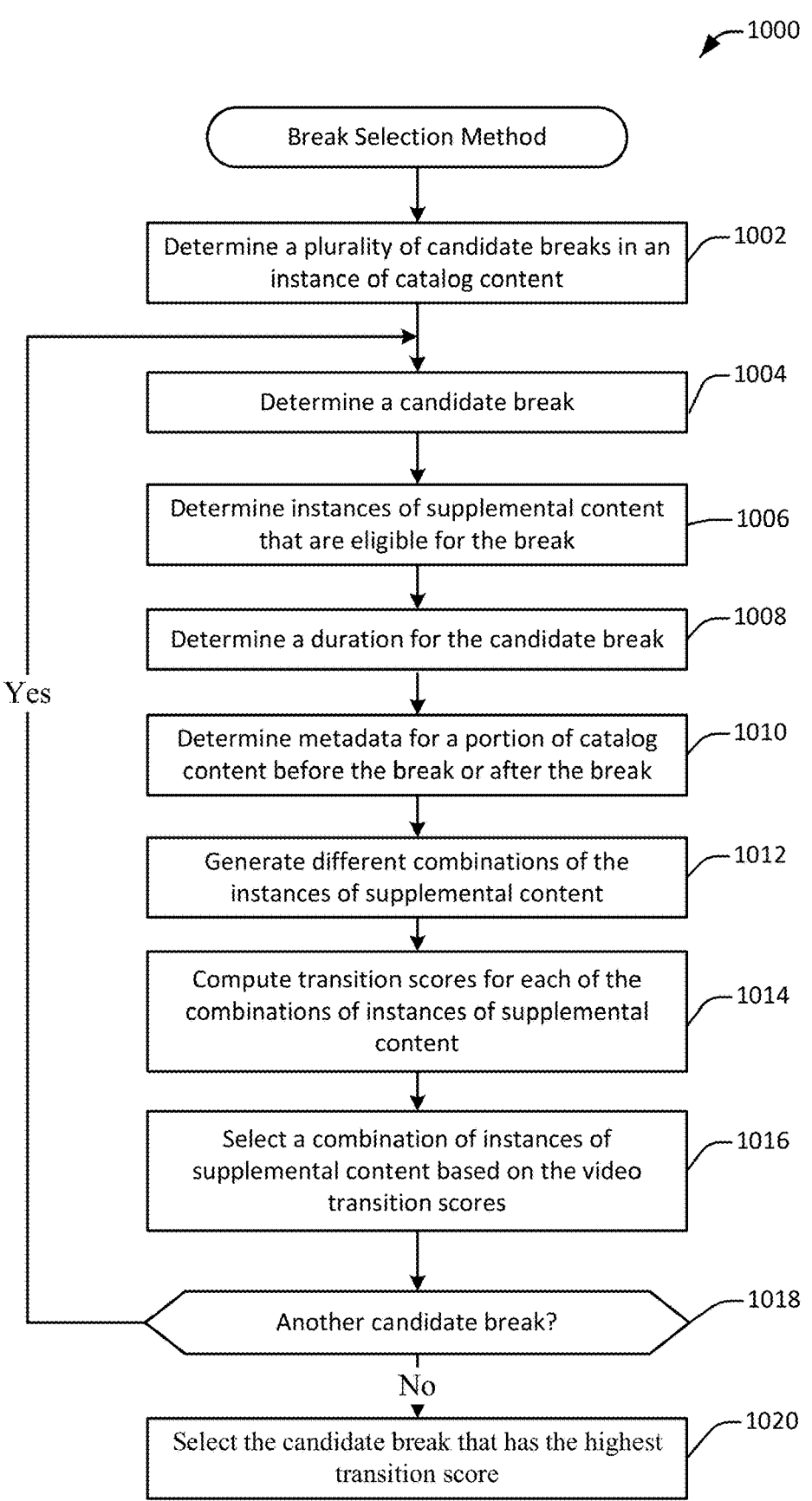
FIG. 10 depicts a simplified flowchart for selecting a break in an instance of catalog content according to some embodiments.

Transition scores may be used to select breaks in an instance of catalog content. FIG. 10 depicts a simplified flowchart 1000 for selecting a break in an instance of catalog content according to some embodiments. At 1002, transition score engine 112 determines a plurality of candidate breaks in an instance of catalog content. The candidate breaks may be possible breaks in the instance of catalog content where a combination of supplemental content can be inserted. One or more of the candidate breaks is selected based on respective transition scores that are computed. For example, there may be three candidate breaks within a time range and only one of the candidate breaks will be selected as a break in the instance of catalog content. The candidate breaks may be determined using different methods. For example, the candidate breaks may be predefined within a time range, such as there may be three candidate breaks between a time of 10:00 minutes to 15:00 minutes. Also, the breaks may be determined using an interval between the time range, such as at 11:00 minutes, 12:00 minutes, 13:00 minutes, and 14:00 minutes; at every X frames, etc. The candidate breaks may also be determined by analyzing the content, such as by detecting scenes, or by input from a user (e.g., manually tagging of breaks at scene changes). In some embodiments, the candidate break that is selected may be used to detect a scene change. One of the candidate breaks in the instance of catalog content may be selected for insertion of instances of supplemental content. The following process may be performed when playback is requested for the instance of content, and breaks are determined. Also, the process may be performed before a request for playback of the instance of content is received.

At 1004, transition score engine 112 determines one of the candidate breaks. Each of the candidate breaks may be processed as follows. Also, the following process may determine instances of supplemental content for each candidate break based on the following analysis, which may determine different combinations of instances of supplemental content for candidate breaks. In other embodiments, a fixed set of instances of supplemental content are determined and used for each candidate break. The process will be described below. At 1006, transition score engine 112 determines instances of supplemental content that are eligible for the candidate break. In some embodiments, the instances of supplemental content may be eligible for placement in the candidate break based on characteristics, such as targeting characteristics.

At 1008, transition score engine 112 determines a duration for the candidate break. The time may be a total time of the candidate break, such as 1 minute, 3 minutes, etc. The duration may be pre-defined, dynamically determined, etc. As discussed above, any number of instances of supplemental content may be inserted in the time period.

At 1010, transition score engine 112 determines metadata for a portion of catalog content before the candidate break or a portion of catalog content after the candidate break. If the catalog content before the candidate break and the catalog content after the candidate break are being used, transition score engine 112 may determine both portions. Or, if one of the portions is not being used, such as the catalog content after the candidate break may not be used, only one of the portions of catalog content before the candidate break is used.

At 1012, transition score engine 112 generates different combinations of the instances of supplemental content that are eligible for the candidate break. The combinations may include one instance of supplemental content, two or more instances of supplemental content, etc. Also, the combinations may include the same instances of supplemental content, but in different orders.

At 1014, transition score engine 112 computes transition scores for each of the combinations of instances of supplemental content. At 1016, transition score engine 112 selects a combination of instances of supplemental content based on the transition scores. In some embodiments, a combination with the highest ranked transition score may be selected. The highest ranked transition score may indicate the analysis predicted a combination of transitions, such as the transition between the portion of content before the candidate break, the transitions between the instances of supplemental content in the combination, and the transition between the instance of supplemental content before the candidate break and the portion of catalog content after the candidate break were ranked the highest.

At 1018, transition score engine 112 determines if there is another candidate break. If so, the process reiterates to 1004 to determine another candidate break. If there is not another candidate break, at 1020, transition score engine 112 selects the candidate break that has the highest transition score. The candidate break that is selected may provide the optimal transition between the content before the candidate break, the selected instances of supplemental content, and the content after the candidate break. Once the breaks are set, the combinations of supplemental content that are selected may be inserted in the breaks.

In some examples, for a first candidate break, the combination might be an instance of supplemental content 1, an instance of supplemental content 3, and an instance of supplemental content 2 with an overall transition score of 0.7. For a second candidate break, the combination might be an instance of supplemental content 1, an instance of supplemental content 2, and an instance of supplemental content 4 with an overall transition score of 0.5. Transition score engine 112 determines that the transition score of 0.7 is higher ranked than the transition score of 0.5 (e.g., 0.7>0.5). Then, transition score engine 112 selects the first candidate break, and supplemental content server 108 inserts an instance of supplemental content 1, an instance of supplemental content 3, and an instance of supplemental content 2 at the first candidate break in that order.

As mentioned above, the one or more instances of supplemental content may be fixed for each candidate break. Then, transition score engine 112 computes transition scores for the content before each candidate break, the same one or more instances of supplemental content, and the content after each candidate break. Transition score engine 112 may select the candidate break with the highest ranked transition score.

Break Identification

In some embodiments, transition score engine 112 can identify breaks for the instance of catalog content. Transition score engine 112 may determine the breaks without using combinations of supplemental content. For example, there may be a range of time in which a break needs to be shown for the instance of catalog content between timestamps T1 and T2. The range may be selected to be not too close to the previous break and next break. Then, within that T1-T2 time window, transition score engine 112 analyzes the content to determine where one or more breaks can be inserted. Transition score engine 112 may select potential break times using different methods. For example, transition score engine 112 may select potential break points on a fixed time period, such as every frame, every two frames, every three frames, every segment, etc. In other examples, transition score engine 112 may receive a list of potential break times, such as from another tool that analyzed the content to determine scene or shot changes.

Transition score engine 112 may process each potential break time to determine a transition score. For example, transition score engine 112 may split the catalog content at a potential break time where there is a portion before the potential break time and a portion after the potential break time. The amount of the portion before or after may be determined in different ways. For example, the portion may be a set time, such as 10 seconds. Also, the portion may be dynamically determined, such as a portion is a scene before or after the potential break, a number of frames before or after the potential break, etc. The portion before the break and the portion after the break may be associated with metadata as described above. Transition score engine 112 generates a transition score from the portion before the potential break and the portion after the potential break. Then, transition score engine 112 processes the subsequent potential breaks. Thereafter, transition score engine 112 may select the potential break with the highest ranked transition score (e.g., highest). In some examples, potential break #1 may have a transition score of 0.2, potential break #2 may have a transition score of 0.9, and potential break #3 may have a transition score of 0.6. Transition score engine 112 selects potential break #1 as the highest ranked break. The lowest score may indicate the content before the break and the content after the break may be considered having the highest change in content. This may improve the break identification because potential break #1 may have the highest ranked transition and may provide an improved transition during playback. For example, this break may be a better transition to pause playback of the instance of catalog content because the content is different (e.g., a scene change). It is noted that the highest ranked transition in this case is different from the highest ranked transition where the combination of instances of supplemental content is selected. When determining a break in the instance of catalog content, a break where the content changes is better. When determining instances of supplemental content to insert in a break, the similarity of content before, after and during the break is considered better. Transition score engine may perform the above process for each time range in the instance of catalog content to select a break.

CONCLUSION

Using the transition score may improve the viewing experience because combinations that include higher-ranked transitions between instances of content may be more likely to be selected. In one example, a higher-ranked transition might not be the highest bid. Having higher transition quality may improve the viewing experience when transitions occur from instances of content. Instead of prioritizing bid value, the system may use the transition score to balance the bid value that is received and the transition quality. The selection of the combination of instances may improve the transition quality when the instances of supplemental content are delivered to client device 104. Thus, the selection of the highest ranked transition score may improve the delivery by providing a smoother, more cohesive viewing experience.

System

Figure 11:
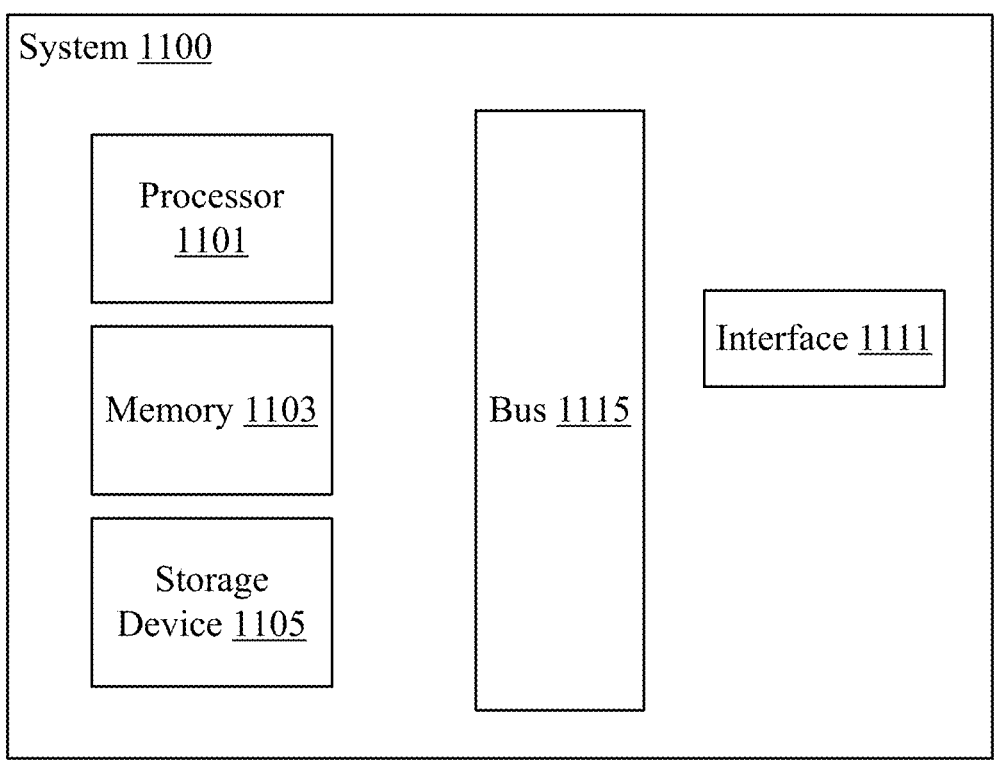
FIG. 11 illustrates one example of a computing device according to some embodiments.

FIG. 11 illustrates one example of a computing device according to some embodiments. According to various embodiments, a system 1100 suitable for implementing embodiments described herein includes a processor 1101, a memory module 1103, a storage device 1105, an interface 1111, and a bus 1115 (e.g., a PCI bus or other interconnection fabric.) System 1100 may operate as a variety of devices such as transition score engine 112, or any other device or service described herein. Although a particular configuration is described, a variety of alternative configurations are possible. The processor 1101 may perform operations such as those described herein. Instructions for performing such operations may be embodied in the memory 1103, on one or more non-transitory computer readable media, or on some other storage device. Various specially configured devices can also be used in place of or in addition to the processor 1101. Memory 1103 may be random access memory (RAM) or other dynamic storage devices. Storage device 1105 may include a non-transitory computer-readable storage medium holding information, instructions, or some combination thereof, for example instructions that when executed by the processor 1101, cause processor 1101 to be configured or operable to perform one or more operations of a method as described herein. Bus 1115 or other communication components may support communication of information within system 1100. The interface 1111 may be connected to bus 1115 and be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by non-transitory computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Java, Python, C++, C. HTML, any other markup language, JavaScript, ActiveX, VBScript, or Perl. Examples of non-transitory computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A non-transitory computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured or operable to perform that which is described in some embodiments.

As used in the description herein and throughout the claims that follow, "a", "an", and "the" include plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations, and equivalents may be employed without departing from the scope hereof as defined by the claims.

What is claimed is:

1. A method comprising:

determining a break in a delivery of an instance of catalog content by a content delivery network;

determining, by a transition score engine, a plurality of instances of supplemental content for the break;

for a plurality of combinations of a plurality of instances of supplemental content, determining, by the transition score engine, a first transition score for a combination of a plurality of instances of supplemental content that rates a transition between the instance of catalog content and one instance of supplemental content in the combination and a second transition score that rates a transition between two sequential instances of supplemental content in the combination;

generating, by the transition score engine, a plurality of final transition scores for the plurality of combinations of the plurality of instances of supplemental content and the instance of catalog content, wherein a final transition score for a combination of the plurality of instances of supplemental content by combining the first transition score and the second transition score;

using, by the transition score engine, the plurality of final transition scores to select a combination of a plurality of supplemental content; and delivering, by the transition score engine, the combination of the plurality of supplemental content to a supplemental content server to cause delivery of the combination of the plurality of supplemental content during the break.

2. The method of claim 1, wherein generating the first transition score comprises:

generating the first transition score between a portion of catalog content before the break and a first instance of supplemental content in the plurality of instances of supplemental content.

3. The method of claim 2, further comprising:

generating a third transition score between a second instance of supplemental content in the plurality of instances of supplemental content and a portion of catalog content after the break.

4. The method of claim 1, further comprising:

generating the first transition score between a portion of catalog content before the break and a first instance of supplemental content; and generating a third transition score between a second instance of supplemental content and a portion of catalog content after the break.

5. The method of claim 1, further comprising:

generating the final transition score for each of the combinations in the plurality of combinations; and selecting one of the combinations based on the final transition score of the plurality of combinations.

6. The method of claim 1, wherein:

generating the first transition score is between a portion of catalog content before the break and a first instance of supplemental content;

a plurality of second transition scores is between a plurality of combinations of instances of supplemental content; and a third transition score is between a third instance of supplemental content and a portion of catalog content after the break.

7. The method of claim 6, wherein generating the final transition score comprises:

generating the final transition score based on the first transition score, the plurality of second transition scores, and the third transition score.

8. The method of claim 1, further comprising:

generating dimension scores based on a comparison of dimensions in first metadata and second metadata, wherein the first metadata is for the plurality of instances of supplemental content and the second metadata is for the instance of catalog content, the first metadata based on an analysis of content characteristics of the plurality of instances of supplemental content and the second metadata is based on an analysis of content characteristics of the instance of catalog content.

9. The method of claim 8, wherein generating the dimension scores comprises:

comparing first metadata for an instance of supplemental content in the plurality of instances of supplemental content to second metadata for the instance of catalog content for each dimension in a plurality of dimensions to generate a plurality of dimension scores, wherein the first transition score is based on the plurality of dimension scores.

10. The method of claim 8, wherein generating the dimension scores comprises:

comparing first metadata for a first instance of supplemental content in the plurality of instances of supplemental content to first metadata for a second instance of supplemental content in the plurality of instances of supplemental content for each dimension in a plurality of dimensions to generate a plurality of dimension scores, wherein the second transition score is based on the plurality of dimension scores.

11. The method of claim 1, further comprising:

generating first metadata for an instance of supplemental content in the plurality of instances of supplemental content based on analyzing content characteristics of the instance of supplemental content, and generating second metadata for the instance of catalog content based on analyzing content characteristics of the instance of catalog content, wherein the first metadata and the second metadata are used to determine the first transition score.

12. The method of claim 1, wherein the break is determined by:

determining a time range in the combination of the plurality of instances of supplemental content;

determining a plurality of potential breaks in the time range;

generating a plurality of transition scores for a plurality of the plurality of potential breaks based on a comparison of first metadata for a portion of catalog content before a respective potential break to second metadata for a portion of catalog content after the respective potential break; and using the plurality of transition scores to select a potential break as the break in a delivery of the instance of catalog content.

13. The method of claim 1, wherein using the plurality of final transition scores to select the combination of plurality of instances of supplemental content comprises:

selecting the combination of the plurality of instances of supplemental content for insertion in the break based on the final transition score for the combination of the plurality of instances of supplemental content.

14. The method of claim 1, wherein using the plurality of final transition scores to select the combination of the plurality of instances of supplemental content comprises:

comparing final transition scores for combinations of the plurality of instances of supplemental content to determine which combination of the plurality of instances of supplemental content to select for the break.

15. The method of claim 1, wherein using the plurality of final transition scores to select the combination of the plurality of instances of supplemental content comprises:

adjusting a value for the combination of the plurality of instances of supplemental content based on the final transition score to generate an adjusted value, wherein the adjusted value is used to determine which combination of the plurality of instances of supplemental content for the break.

16. The method of claim 1, wherein using the plurality of final transition scores to select the combination of the plurality of instances of supplemental content comprises:

determining values for the plurality of combinations of the plurality of instances of supplemental content; and adjusting a value for the plurality of combinations of the plurality of instances of supplemental content based on the respective final transition score to generate an adjusted value, wherein the respective adjusted value for the plurality of combinations of the plurality of instances of supplemental content is used to determine which combination of the plurality of instances of supplemental content to select for the break.

17. The method of claim 1, further comprising:

generating a final transition score for a plurality of breaks, wherein the final transition score is based on a combination of the plurality of instances of supplemental content being selected for the break; and selecting one of the plurality of breaks based on a respective final transition score for the break.

18. The method of claim 1, wherein:

the first transition score is based on a comparison of first metadata for a first instance of supplemental content in the combination of a plurality of instances of supplemental content to second metadata for the instance of catalog content, the first metadata based on an analysis of content characteristics of the first instance of supplemental content and the second metadata based on an analysis of content characteristics of the instance of catalog content, and the second transition score is based on a comparison of the second metadata for the first instance of supplemental content to third metadata for a second instance of supplemental content in the combination of a plurality of instances of supplemental content, the third metadata based on an analysis of content characteristics of the second instance of supplemental content, wherein the first instance of supplemental content and the second instance of supplemental content are sequential.

19. A non-transitory computer-readable storage medium having stored thereon computer executable instructions, which when executed by a computing device, cause the computing device to be operable for:

determining a break in a delivery of an instance of catalog content by a content delivery network;

determining, by a transition score engine, a plurality of instances of supplemental content for the break;

for a plurality of combinations of a plurality of instances of supplemental content, determining, by the transition score engine, a first transition score for a combination of a plurality of instances of supplemental content that rates a transition between the instance of catalog content and one instance of supplemental content in the combination and a second transition score that rates a transition between two sequential instances of supplemental content in the combination;

generating, by the transition score engine, a plurality of final transition scores for the plurality of combinations of the plurality of instances of supplemental content and the instance of catalog content, wherein a final transition score for a combination of the plurality of instances of supplemental content by combining the first transition score and the second transition score;

using, by the transition score engine, the plurality of final transition scores to select a combination of a plurality of supplemental content; and delivering, by the transition score engine, the combination of the plurality of supplemental content to a supplemental content server to cause delivery of the combination of the plurality of supplemental content during the break.

20. An apparatus comprising:

one or more computer processors; and a computer-readable storage medium comprising instructions for controlling the one or more computer processors to be operable for:

determining a break in a delivery of an instance of catalog content by a content delivery network;

determining by a transition score engine, a plurality of instances of supplemental content for the break;

determining, by a transition score engine, a plurality of instances of supplemental content for the break;

for a plurality of combinations of a plurality of instances of supplemental content, determining, by the transition score engine, a first transition score for a combination of a plurality of instances of supplemental content that rates a transition between the instance of catalog content and one instance of supplemental content in the combination and a second transition score that rates a transition between two sequential instances of supplemental content in the combination;

generating, by the transition score engine, a plurality of final transition scores for the plurality of combinations of the plurality of instances of supplemental content and the instance of catalog content, wherein a final transition score for a combination of the plurality of instances of supplemental content by combining the first transition score and the second transition score; and using, by the transition score engine, the plurality of final transition scores to select a combination of a plurality of supplemental content; and delivering, by the transition score engine, the combination of the plurality of supplemental content to a supplemental content server to cause delivery of the combination of the plurality of supplemental content during the break.

* * * * *